United States Patent
Datta Roy et al.

(10) Patent No.: US 7,346,711 B1
(45) Date of Patent: Mar. 18, 2008

(54) METHODS, SYSTEMS, AND COMPUTER PROGRAM PRODUCTS FOR DETECTING IDE DEVICE CONNECTIONS

(75) Inventors: Sandip Datta Roy, Lilburn, GA (US); Kevin Moore, Round Rock, TX (US)

(73) Assignee: American Megatrends, Inc., Norcross, GA (US)

( * ) Notice: Subject to any disclaimer, the term of this patent is extended or adjusted under 35 U.S.C. 154(b) by 662 days.

(21) Appl. No.: 10/661,723

(22) Filed: Sep. 12, 2003

(51) Int. Cl.
  *G06F 3/00* (2006.01)

(52) U.S. Cl. .............................. 710/3; 710/15; 710/18

(58) Field of Classification Search .................... None
  See application file for complete search history.

(56) References Cited

U.S. PATENT DOCUMENTS 5,920,709 A * 7/1999 Hartung et al. ............. 710/305
7,046,519 B2 * 5/2006 Nakamura ................... 361/737

\* cited by examiner

Primary Examiner—Kim Huynh
Assistant Examiner—Jasjit Vidwan
(74) Attorney, Agent, or Firm—Hope Baldauff Hartman, LLC

(57) ABSTRACT

Methods, systems, and computer readable mediums provide for the detection of IDE drives connected to intelligent drive electronics channels within a computer. Detection may be obtained by reading a status register destination and detecting whether data read from the status register destination has a predefined value. Based on the data read from the status register destination, an indication that an IDE drive is connected to the intelligent drive electronics channel is returned. Detection of enhanced IDE or ATAPI drives connected to an intelligent drive electronics channel is also provided. Enhanced IDE drives may be detected by reading a cylinder high register destination and a cylinder low register destination to detect a predefined signature. Based on the data read from the cylinder high and the cylinder low register destinations, an indication that an enhanced IDE drive is connected to an intelligent drive electronics channel is returned.

14 Claims, 4 Drawing Sheets

| DEVICE/HEAD 202 | | | | | | | | |
|---|---|---|---|---|---|---|---|---|
| | 7 | 6 | 5 | 4 302 | 3 | 2 | 1 | 0 |
| | OBS | # | OBS | DEV | # | # | # | # |

| STATUS 303 204 | | | | | | | | |
|---|---|---|---|---|---|---|---|---|
| | BSY | DRDY 304 | # | # | DRQ 307 | OBS | OBS | ERR 310 |

| CYLINDER HIGH 206 | | | | | | | | |
|---|---|---|---|---|---|---|---|---|
| | # | # | # | # | # | # | # | # |

| CYLINDER LOW 208 | | | | | | | | |
|---|---|---|---|---|---|---|---|---|
| | # | # | # | # | # | # | # | # |

*Fig. 3*

METHODS, SYSTEMS, AND COMPUTER PROGRAM PRODUCTS FOR DETECTING IDE DEVICE CONNECTIONS

TECHNICAL FIELD

The present invention relates to computer diagnostics and initialization. More particularly, the present invention relates to detecting the presence of integrated drive electronic devices prior to performing device diagnostics and initialization.

BACKGROUND

One of the most common storage interfaces utilized in today's computers is the Integrated or Intelligent Drive Electronics (IDE) interface. IDE interfaces are also known as Advanced Technical Attachment (ATA) interfaces. Hard disk, CD ROM, floppy, and tape drives that have integrated controllers are very likely connected to an IDE interface channel in computers today. When a computer resets or powers on, connected IDE drives enter a diagnostic state and the basic input/output system (BIOS) executes a power on self-test (POST) for diagnostic and initialization purposes. IDE drive initialization is included in the POST process to prepare the IDE drive for operation during runtime.

Previous methods and systems for including a device or drive in the initialization process included manually recording the drive connection and location via a BIOS setup utility. These previous methods and systems are cumbersome, requiring a user to modify the setup utility whenever a drive is attached to or removed from the computer interface. As a result, costly additional human resources and time are required to include drives in POST diagnostics and initialization.

Present solutions for detecting the presence and location of an IDE drive before spending POST time for diagnostics and initialization of the drive, include a method for the BIOS to automatically detect whether an IDE drive is connected to the IDE interface channel of the computer system. However because these present solutions may detect the false presence of an IDE drive, valuable POST time is frequently wasted performing diagnostic and initialization procedures on non-existent IDE drives. Thus, the time of POST is increased and runtime is delayed because of false IDE drive detections.

SUMMARY

Embodiments of the present invention address these problems and others by providing methods and systems that enable the BIOS to read and determine the values of the data written to one or more interface register destinations for an IDE device or drive. The data stored in the interface register destinations helps the BIOS determine whether the IDE drive is present. The interface register destinations are defined in the IDE interface channel. The IDE interface channel transfers register contents to the IDE drives and their embedded IDE drive controllers. Thus, the BIOS can efficiently and accurately determine whether an IDE drive is present. As a result, the use of valuable POST time to perform diagnostic and initialization procedures on non-existent IDE devices is avoided. Additionally, certain embodiments of the present invention allow detection as to whether an advanced technology attachment peripheral interface (ATAPI) drive, also known as an enhanced IDE drive (EIDE), is attached to an IDE channel.

One embodiment is a method for detecting whether an IDE drive is connected to an intelligent drive electronics channel within a computer. The method involves reading a status register destination for the IDE drive and based on a value read from the status register destination, determining whether the IDE drive is connected. For instance, when the data read from the status register destination does not have a predefined value, the method returns that the IDE drive is connected to the intelligent drive electronics channel.

Another embodiment is a method for detecting whether an ATAPI drive is connected to an intelligent drive electronics channel within a computer. The method involves reading the cylinder high register destination and the cylinder low register destination for the ATAPI drive and based on a first value read from the cylinder high register destination and a second value read from the cylinder low register destination, determining whether the ATAPI device is connected. For instance, when the data read from the cylinder high register destination has a first predefined value and the data read from the cylinder low register destination has a second predefined value, the method returns that the ATAPI drive is connected to the intelligent drive electronics channel.

An embodiment of the present invention may be a computer program product including a computer readable medium storing control logic for causing a computer to detect whether an IDE drive is connected to an intelligent drive electronics channel within the computer. The control logic includes computer readable program code for causing the computer to read a status register destination for the IDE drive and detect whether data read from the status register destination has a predefined value. When the data read from the status register destination does not have the predefined value, the computer readable program code returns an indication to the BIOS that an IDE drive is connected to the intelligent drive electronics channel.

Another embodiment of the present invention may be a computer program product including a computer readable medium storing control logic for causing a computer to detect whether an ATAPI drive is connected to an intelligent drive electronics channel within the computer. The control logic includes computer readable program code for causing the computer to read the cylinder high register destination and the cylinder low register destination for the ATAPI drive and detect whether data read from the cylinder high and cylinder low register destinations match a predefined signature. When the data read from the cylinder high and cylinder low register destinations match the predefined signature, the computer program code returns an indication to the BIOS that the ATAPI drive is connected to the intelligent drive electronics channel.

An embodiment of the present invention may also be a computer system for detecting whether an IDE drive is connected to an intelligent drive electronics channel within the computer system. The computer system includes a processor coupled to a memory and a bus coupled to the processor that is capable of hosting at least one IDE drive via an intelligent drive electronics channel. The computer system also includes a BIOS program capable of being executed on the processor. When the BIOS program executing on the processor reads a status register destination for the IDE drive and detects whether data read from the status register destination has a predefined value. When the data read from the status register destination does not have the predefined value, the BIOS program returns an indication that an IDE drive is connected to the intelligent drive electronics channel.

Another embodiment of the present invention may also be a computer system operative to detect whether an ATAPI drive is connected to an intelligent drive electronics channel within the computer. The computer system includes a processor coupled to a memory and a bus coupled to the processor that is capable of hosting at least one ATAPI drive via an intelligent drive electronics channel. The computer system also includes a BIOS program capable of being executed on the processor. When the BIOS program executing on the processor reads the cylinder high and cylinder low register destinations and detects that data read matches a predefined signature, the BIOS program returns an indication that the ATAPI drive is connected to the intelligent drive electronics channel.

DESCRIPTION OF THE DRAWINGS

FIG. 3 illustrates the field bit structure of the interface register destinations of FIG. 2.

DETAILED DESCRIPTION

IDE drive connections may be automatically detected through embodiments of the present invention so that false detections do not occur and valuable POST time is not wasted performing diagnostic and initialization procedures on non-existent IDE drives. For example, the BIOS can efficiently and accurately detect whether an IDE drive is connected to an intelligent drive interface channel prior to conducting POST initialization procedures to prepare the drive for operation. The BIOS detects the presence of an IDE drive by reading the data in the status register destination for the IDE drive. Additionally, certain embodiments of the present invention enable efficient and accurate detection as to whether an ATAPI drive, also known as an enhanced IDE drive, is attached to an IDE channel.

Figure 1:
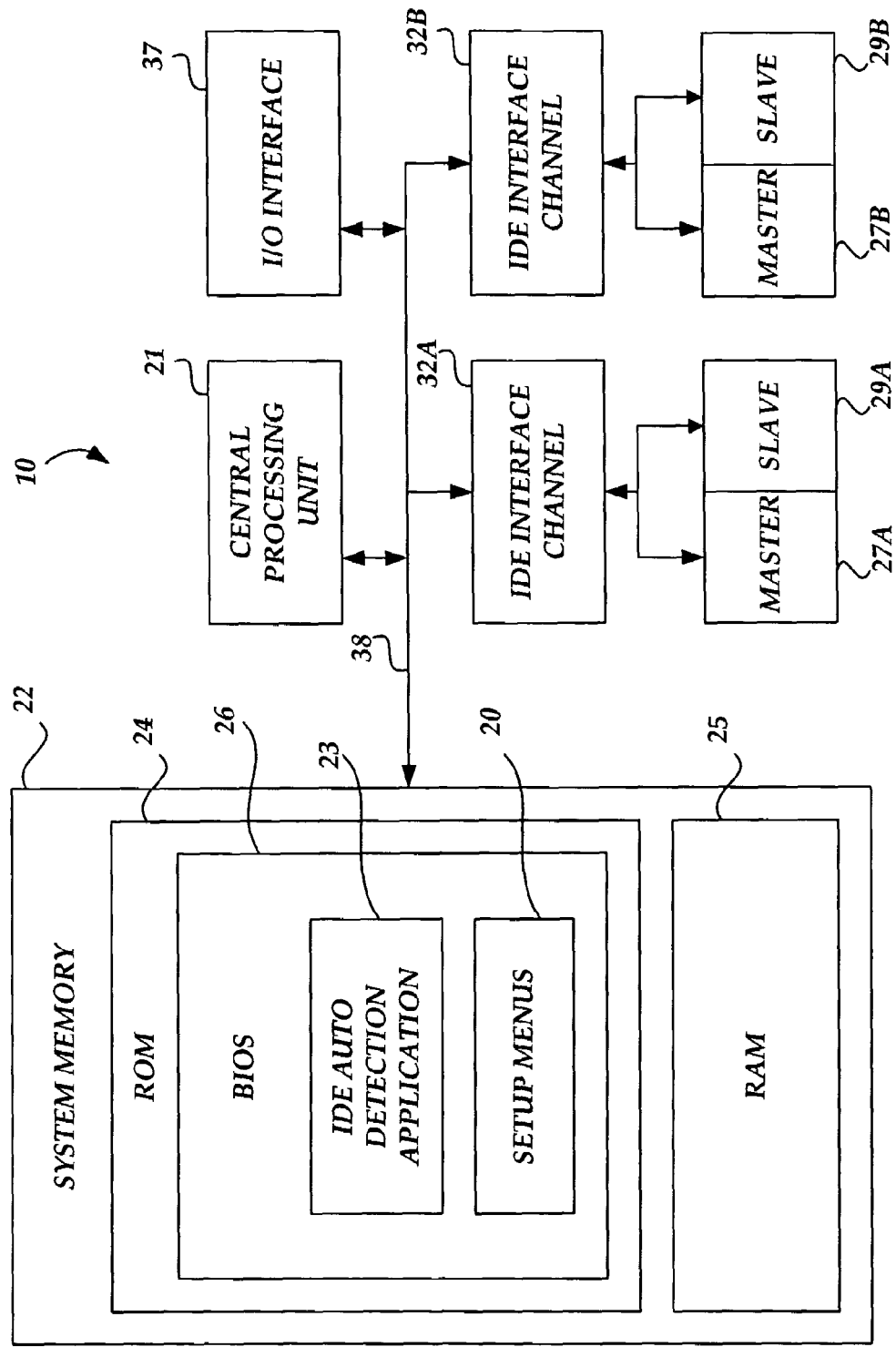
FIG. 1 illustrates a host computer architecture utilized in embodiments of the present invention.

A host computer architecture utilized in embodiments of the present invention is shown in FIG. 1. The host computer 10 generally includes a system memory 22, a central processing unit (CPU) 21, and a system bus 38 that couples the system memory 22 to the processing unit 21. The host computer 10 also includes the IDE channels 32A/32B that may interface with the IDE master/slave devices 27A/29A and 27B/29B also recognized as mass storage devices. The mass storage devices 27/29 may be connected to the CPU 21 through the IDE interface channels 32A/32B connected to the bus 38. The mass storage devices 27/29 and their associated computer-readable media, provide non-volatile storage for the computer 10. Although the description of computer-readable media contained herein refers to a mass storage device, such as a hard disk or CD-ROM drive, it should be appreciated by those skilled in the art that computer-readable media can be any available media that can be accessed by the computer 10.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

The system memory 22 includes read-only memory (ROM) 24 and random access memory (RAM) 25. A BIOS 26, containing the basic routines that help to transfer information between elements within the host computer 10, such as during start-up, is stored in ROM 24. The BIOS 26 also includes an IDE auto detection application 23 and setup menus 20 utilized in the detection and initialization of the mass storage devices 27/29. Once the IDE auto detection application 23 assists the BIOS 26 in detecting whether a mass storage device 27/29 is present, the setup menu houses the initialized settings for the mass storage devices 27/29.

The computer 10 may also include an input/output interface controller 37 for receiving and processing input from a number of devices, including a keyboard or mouse (not shown). Similarly, an input/output interface controller 37 may provide output to a display screen, a printer, or other type of output device.

Figure 2:
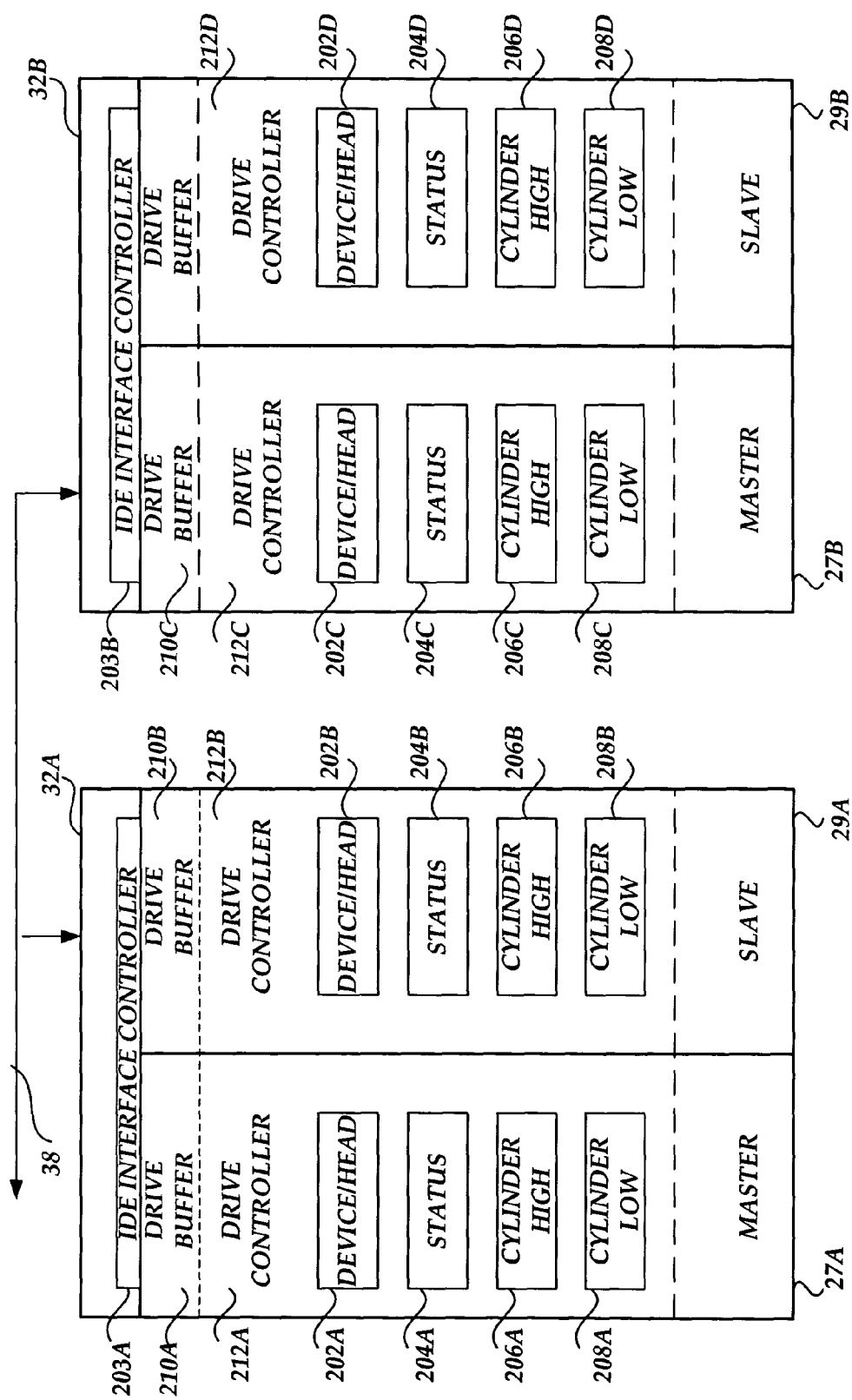
FIG. 2 illustrates the interface register destinations for the IDE drives according to an embodiment of the present invention.

FIG. 2 illustrates the interface register destinations for the IDE drives according to an embodiment of the present invention. The IDE interface channels 32 each include an IDE interface controller 203 connected to the mass storage devices 27/29. The mass storage devices 27/29 each include drive controllers 212. Each drive controller 212 houses interface register destinations 202, 204, 206, and 208 for sending commands to the mass storage devices 27/29 or posting status from the devices 27/29. The interface register destinations are command block register destinations that are decoded by the IDE interface controllers 203. The command block register destinations include, among others, the device head 202, status 204, cylinder high 206, and cylinder low 208 register destinations. The contents of the register destinations are transferred to both the master 27 and the slave 29 devices and their embedded controllers 212. The host computer 10 discriminates between the two IDE devices 27 and 29 per channel 32 by using a bit in the device head register destination 202. Additional details regarding the bit structure of the device head register destination will be described below with respect to FIG. 3.

Data is transferred in parallel either to or from host memory to the drive buffers 210 under the direction of the commands previously transferred from the host computer 10. The status register destination 204 contains the status of the device 27/29. The contents of this register destination are updated to reflect the current state of the device 27/29 and the progress of any command being executed in the device 27/29. After a reset condition and during POST, the IDE auto detection application 23 causes the BIOS 26 to read the status register destination 204 for a selected device 27/29. When the status register destination 204 indicates drive activity, the BIOS 26 receives an indication that the selected device or drive 27/29 is connected to the IDE interface channel 32. Additional details regarding the bit structure of the status register destination 204 will be described below with respect to FIG. 3.

Certain drives 27/29 utilize a different command structure than standard IDE drives. For example ATAPI drives, such as a CD ROM drive, utilize a packet command feature set to facilitate faster communication. Because of the command configuration, connected ATAPI drives may not show drive activity via the status register destination 204. However, in a reset condition, ATAPI drives have a consistent signature reflected in the data values of the cylinder high register destination 206 and the cylinder low register destination 208. This consistent signature enables the BIOS 26 to detect whether an ATAPI drive is present. Additional details regarding the reset condition signature of ATAPI drives will be described below with respect to FIGS. 3-4.

FIG. 3 illustrates the field bit structure of the interface register destinations of FIG. 2. The device select (DEV) bit, bit four (4) 302 of the device head register destination 202 discriminates between the master 27 and the slave 29 devices per IDE interface channel 32. For example, when the DEV bit is cleared to zero the device having the drive select value of zero is selected. When the DEV bit is set to one (1), the device having the drive select value of one is selected. Bits five and seven are obsolete bits, ignored by the drives 27/29. Other bits in the device/head register destination 202 are command dependent, denoted by '#'.

Referring to the status register destination 204, when the combined data read from the status register destination 204 does not equal a zero (00h) hex value, standard IDE drive presence is detected. The busy (BSY) bit 303, bit 7, is set to one (1) to indicate that the selected device is busy, thereby indicating drive presence. The device ready (DRDY) bit 304, bit 6, is cleared to zero (0) by the device 27/29 during a reset condition when the device implements the packet command feature set. ATAPI devices implement the packet command feature set thus a zero hex value may be detected when an ATAPI device is attached.

Moreover, the data request (DRQ) bit 307, bit 3 is cleared to zero when the last word of the command packet transfer occurs for a packet command thus providing further evidence of an ATAPI attachment. The error (ERR) bit 310, bit zero, is cleared to zero during a reset condition. As described briefly above, when a reset condition occurs ATAPI drives have a consistent signature in the cylinder high 206 and the cylinder low 208 register destinations in which all the bits are command dependent, denoted by '#'. The signature is based on the combined hex value of all the data contained in each of the register destinations 206 and 208. For example, the signature values for a reset condition may be 14h for the cylinder low register destination 208 and EBh for the cylinder high register destination 206.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 4:
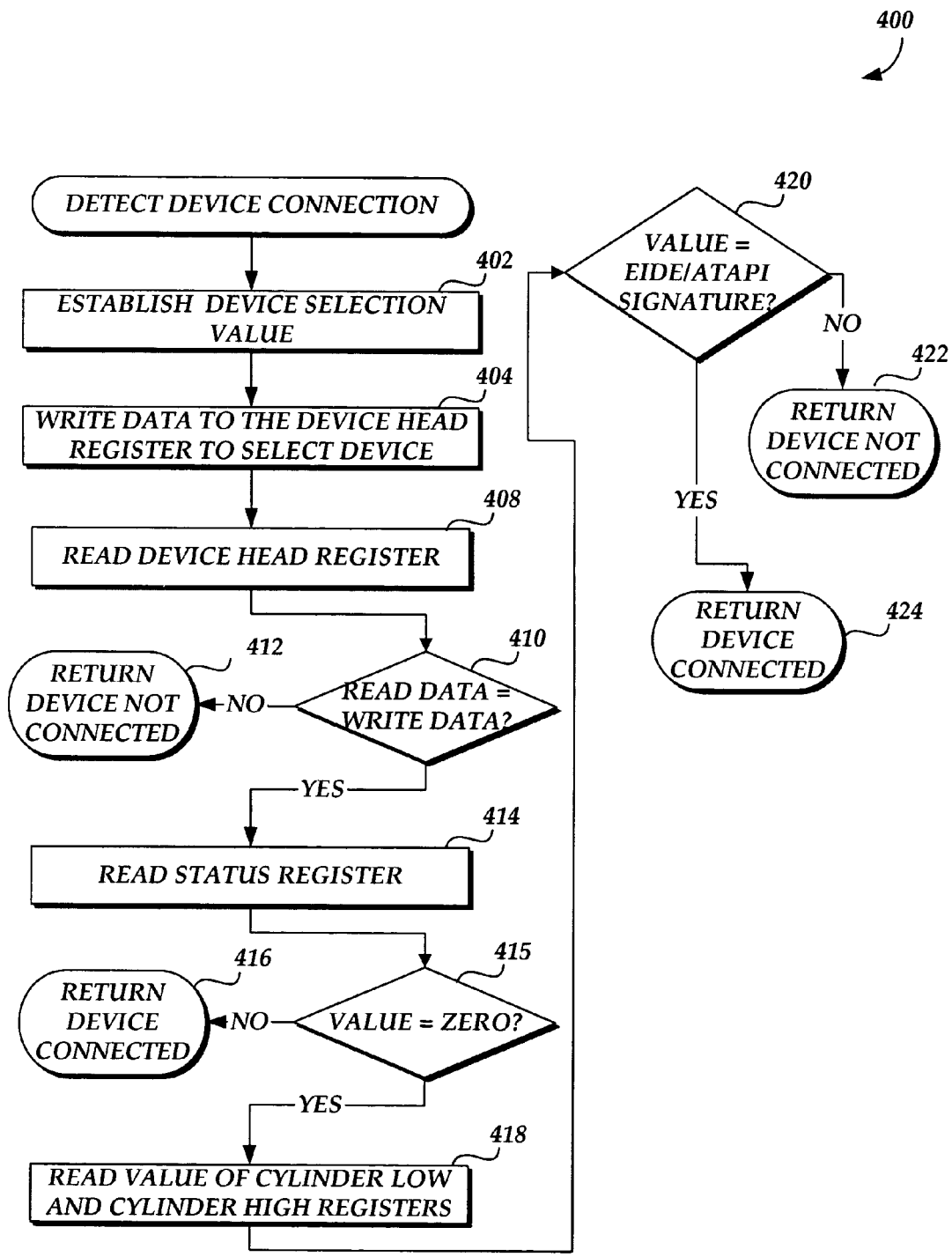
FIG. 4 shows the logical operations for detecting an IDE drive connected to an intelligent drive electronics channel according to an embodiment of the present invention.

FIG. 4 shows the logical operations for detecting an IDE drive connected to an intelligent drive electronics channel according to an embodiment of the present invention. After a reset condition within the computer and during the POST, the routine 400 begins at value operation 402 where device selection values for each IDE device, such as IDE drives, are established. This may be accomplished by designating the devices for each channel as device 0 and device 1. Reset conditions may include a power on reset of the computer, a hardware reset, and an execute drive diagnostics command. Reset conditions may also include a software reset and an IDE drive reset.

Next the routine 400 continues to select operation 404, where an IDE device is selected by writing data to the device head register destination 202 for the IDE device (The device head register destination is also known as the drive head register destination). The data value written in the device select (DEV) bit 302 of the device head register destination 202 determines which device is selected. For example, when the DEV bit is cleared to zero, device 0 is selected and when the DEV bit is set to one, device 1 is selected. The selected IDE device may include a hard disk drive, a floppy drive, a CD ROM, and a tape drive.

After the IDE device selection, the routine 400 then continues to read operation 408, where the device head register destination 202 is read. The routine 400 then continues to detection operation 410. At operation 410, detection is made as to whether the data read from the device head register destination matches the data written to the device head register destination. When the data read from the device head register destination does not match the data written to the drive head register destination, the routine 400 continues to return operation 412. At return operation 412, the routine 400 returns an indication that the selected IDE device is absent, thus, not connected to the intelligent drive electronics channel. When IDE devices are not present, what was written to the device head register destination 202 at operation 404 is not decoded and reflected in a response from the IDE device, thus causing the data comparison not to match.

When the data read from the device head register destination 202 matches the data written to the device head register destination 202, the routine 400 continues from detection operation 410 to read operation 414 where the status register destination 204 is read. The routine 400 then continues to detection operation 415 where detection is made as to whether data read from the status register destination 204 has a predefined hex value, for example 00h. When the data read from the status register destination 204 does not have the predefined hex value, the routine 400 continues to return operation 416. At return operation 416, the routine 400 returns an indication that the IDE drive is connected to the intelligent drive electronics channel. For example a predefined hex value of zero (0) reflects device inactivity, as if no IDE device is present. Thus, when the predefined value is not zero, activity reflecting the presence of an IDE device is confirmed by the status register destination value.

When the data read from the status register destination 204 has the predefined hex value, the routine 400 continues from detection operation 415 to read operation 418. IDE devices that utilize a packet command feature set, such as ATAPI devices, have a consistent reset condition signature in the cylinder high and cylinder low register destinations but return a predefined hex value of zero (0) in the status register destination 204. Thus, a reading of additional register destinations for device detection is merited after detecting the predefined hex value at detection operation 415. At read operation 418, the cylinder low register destination 208 and the cylinder high register destination 206 of the IDE device are read.

Next, the routine 400 continues to detection operation 420, where detection as to whether data read from the cylinder low register destination 208 and the cylinder high register destination 206 matches a predefined signature, for example data hex values of 14h for the cylinder low register destination 208 and EBh for the cylinder high register destination 206. When the data read from cylinder low register destination 208 and the cylinder high register destination 206 matches the predefined signature, the routine 400 continues to return operation 424. At return operation 424, the routine 400 returns an indication that the IDE device is connected to the intelligent drive electronics channel. When the cylinder register destinations do not match the predefined signature, the routine 400 continues to return operation 422, where an indication that the IDE device is absent or not connected to the intelligent drive electronics channel is returned.

It should be appreciated that operations of FIG. 4 are useful when isolated from one another. For example, if specifically detecting non-ATAPI devices, then there is no need to proceed beyond reading, determining the value of, and returning an indication of the status register destination at operations 414, 415, and 416. In contrast, if specifically detecting for ATAPI devices, then reading the cylinder high and the cylinder low register destinations at operation 418 without reading the status register destination will be sufficient. It is understood that embodiments of the present invention include the isolation of operations for specific purposes.

Thus, the present invention is presently embodied as methods, systems, computer program products or computer readable medias encoding a computer program for automatically detecting IDE device connections.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for detecting whether an IDE drive is connected to an intelligent drive electronics channel within a computer, comprising:
    writing data to a drive head register destination for the IDE drive;
    in response to writing the data to the drive head register destination, reading the drive head register destination;
    detecting whether the data read from the drive head register destination matches the data written to the drive head register destination;
    in response to the data read from the drive head register destination not matching the data written to the drive head register destination, returning that the IDE drive is not connected to an intelligent drive electronics channel;
    in response to the data read from the drive head register destination matching the data written to the drive head register destination, reading the status register destination;
    reading a status register destination for the IDE drive;
    detecting whether data read from the status register destination has a first predefined value;
    upon the data read from the status register destination not having the first predefined value, returning that the IDE drive is connected to the intelligent drive electronics channel;
    upon the data read from the status register destination having the first predefined value, reading a cylinder low register destination and a cylinder high register destination of the drive;
    detecting whether data read from the cylinder low register destination and the cylinder high register destination matches a predefined signature; and
    in response to the data read from cylinder low register destination and the cylinder high register destination matching the predefined signature, returning that the IDE drive is connected to the intelligent drive electronics channel.

2. The method of claim 1, further comprising:
    prior to writing data to a drive head register destination for the IDE drive, establishing a drive selection value for each IDE drive; and
    selecting the IDE drive for detection by writing a drive selection value to the drive head register destination.

3. The method of claim 2, wherein two IDE drives may be connected per intelligent drive electronics channel and wherein a one of the IDE drives comprises a master drive and a one of the IDE drives comprises a slave drive.

4. The method of claim 3, wherein the drive selection value represents at least one of the master drive and the slave drive.

5. The method of claim 2 further comprising, prior to reading a status register destination, resetting the computer.

6. The method of claim 5, wherein resetting the computer comprises executing at least one of the following:
    a power on reset of the computer;
    a hardware reset;
    an execute drive diagnostics command;
    a software reset; and
    a drive reset.

7. The method of claim 1, wherein the IDE drive connected to the intelligent drive electronics channel implements a packet command feature set.

8. The method of claim 1, further comprising in response to the data read from cylinder low register destination and the cylinder high register destination not matching the predefined signature, returning that the IDE drive is not connected to an intelligent drive electronics channel.

9. The method of claim 8, wherein the predefined signature comprises a second predefined value of the cylinder high register destination and a third predefined value of the cylinder low register destination.

10. The method of claim 1, wherein the IDE drive comprises at least one of the following:
    a hard disk drive;
    a floppy drive;
    a CD ROM disk drive; and
    a tape drive.

11. A computer program product comprising a computer storage medium having control logic stored therein for causing a computer to detect whether an IDE drive is connected to an intelligent drive electronics channel within the computer, said control logic comprising computer readable program code means for causing the computer to:
  establish a drive selection value for each IDE drive wherein each IDE drive comprises at least one of a master IDE device and a slave IDE device;
  select the IDE drive for detection by writing data to a drive head register destination for the IDE drive wherein the data includes the drive selection value established for the IDE drive;
  in response to writing the data to the drive head register destination, read the drive head register destination;
  detect whether the data read from the drive head register destination matches the data written to the drive head register destination;
  in response to the data read from the drive head register destination not matching the data written to the drive head register destination, return a first indication that the IDE drive is not connected to the intelligent drive electronics channel;
  in response to the data read from the drive head register destination matching the data written to the drive head register destination, read the status register destination for the IDE drive;
  detect whether data read from the status register destination has a first predefined value;
  upon the data read from the status register destination not having the first predefined value, return a second indication that an IDE drive is connected to the intelligent drive electronics channel;
  upon the data read from the status register destination having the first predefined value, read a cylinder low register destination and a cylinder high register destination for the IDE drive;
  detect whether data read from the cylinder low register destination and the cylinder high register destination matches a predefined signature; and
  in response to the data read from cylinder low register destination and the cylinder high register destination matching the predefined signature, return the second indication that the IDE drive is connected to the intelligent drive electronics channel.

12. The computer program product of claim 11, wherein the IDE drive connected to the intelligent drive electronics channel implements a packet command feature set.

13. The method of claim 11, wherein the predefined signature comprises a second predefined value of the cylinder high register destination and a third predefined value of the cylinder low register destination.

14. A computer system for detecting whether an IDE drive is connected to an intelligent drive electronics channel within the computer system, the computer system comprising:
  a processor coupled to a memory;
  at least one bus coupled to the processor and capable of hosting at least one IDE drive via an intelligent drive electronics channel; and
  a basic input/output system program capable of being executed on the processor and, when executed on the processor, operative to:
    establish a drive selection value for each IDE drive wherein each IDE drive comprises at least one of a master IDE device and a slave IDE device;
    select the IDE drive for detection by writing data to a drive head register destination for the IDE drive wherein the data includes the drive selection value established for the IDE drive;
    in response to writing the data to the drive head register destination, read the drive head register destination;
    detect whether the data read from the drive head register destination matches the data written to the drive head register destination;
    in response to the data read from the drive head register destination not matching the data written to the drive head register destination, return a first indication that the IDE drive is not connected to the intelligent drive electronics channel;
    in response to the data read from the drive head register destination matching the data written to the drive head register destination, read the status register destination;
    detect whether data read from the status register destination has a first predefined value;
    upon the data read from the status register destination not having the first predefined value, return a second indication that an IDE drive is connected to the intelligent drive electronics channel
  upon the data read from the status register destination having the first predefined value, read a cylinder low register destination and a cylinder high register destination for the IDE drive;
  detect whether data read from the cylinder low register destination and the cylinder high register destination matches a predefined signature; and
  in response to the data read from cylinder low register destination and the cylinder high register destination matching the predefined signature, return the second indication that the IDE drive is connected to the intelligent drive electronics channel.

* * * * *

UNITED STATES PATENT AND TRADEMARK OFFICE
CERTIFICATE OF CORRECTION

| | | |
|---|---|---|
| PATENT NO. | : 7,346,711 B1 | Page 1 of 1 |
| APPLICATION NO. | : 10/661723 | |
| DATED | : March 18, 2008 | |
| INVENTOR(S) | : Sandip Datta Roy and Kevin Moore | |

It is certified that error appears in the above-identified patent and that said Letters Patent is hereby corrected as shown below:

Column 2, line 60, and ending with Column 2, line 63 should read:

The BIOS program executing on the processor reads a status register destination for the IDE drive and detects whether data read from the status register destination has a predefined value.

Column 10, line 35, and ending with Column 10, line 38 should read:

14.    upon the data read from the status register destination not having the first predefined value, return a second indication that an IDE drive is connected to the intelligent drive electronics channel;

Signed and Sealed this

Twenty-second Day of July, 2008

JON W. DUDAS
*Director of the United States Patent and Trademark Office*